United States Patent Office 3,356,589
Patented Dec. 5, 1967

3,356,589
NUCLEAR REACTOR CORE BAFFLE
Philippe Grell and Edouard Harmant, Brussels, Belgium, and John Alan Dodd and James Anthony Driscoll, Risley, England, assignors to Societe Anglo-Belge Vulcain, societe anonyme, Brussels, Belgium
Filed Feb. 1, 1965, Ser. No. 429,581
Claims priority, application Luxembourg, Feb. 7, 1964, 45,385
1 Claim. (Cl. 176—87)

This invention relates to a core baffle for nuclear reactors, in which fuel elements are placed according to a certain configuration with a view to forming a core which may become critical, through which a liquid or gaseous coolant flows, the fuel elements being generally formed by long rods arranged in a parallel direction one next to the other according to a regular network of square or triangular pitch in such a manner as to form a core. Generally, the outer contour of this core approximates a circle.

Normally in reactors cooled by a liquid or gaseous fluid, the core is surrounded by an impervious wall enclosing this fluid, indicated hereinafter by "baffle."

Such a wall must answer the following conditions:

to be sufficiently rigid to resist the stresses due to differences of pressure upon the two faces of the wall resulting namely from the loss of head associated to the flow of coolant inside the wall. It is indeed indispensable that the distance between the peripheral rods of the core and the outer casing shall be maintained within narrow limits in order to ensure an appropriate cooling of the said rods;
to possess a high resistance to corrosion;
to have a neutron absorption as small as possible.

Indeed, an appreciable number of neutrons generated in the core cross the baffle, are slowed down inside the reflector and are sent back partly through the baffle towards the core. It is therefore important to avoid the absorption of the neutrons generated in the core, whilst retaining a sufficient rigidity for the assembly.

The invention consists in a baffle for a core of a nuclear reactor, formed of several elements assembled to one another, characterized in that the said elements are formed by a wall of small thickness, the edges of which are bent over to form ribs serving for the assembly of the said elements to one another and increasing the rigidity of the casing sufficiently to prevent its distortion by the differences of pressure to which it is exposed.

It should be noted that a reduced thickness of the baffle may form a non negligible saving in view of the high cost of special nuclear materials (for instance zirconium alloys) used for the manufacture of such baffle.

The thin and very rigid baffle according to the present invention may be mounted around the core of a nuclear reactor and is particularly adapted to be assembled around a core having a corrugated surface.

The baffle constructed according to one aspect of the present invention is formed of an assembly of several elements of identical profiles.

The edges of the elements are turned over in such a manner as to form reinforcement ribs, and the various elements may be fixed together by bolts or rivets, or by welding, the ribs forming reinforcing ridges outside the core. The baffle thus formed is preferably reinforced also in the direction of the height by circular bands or rings, also situated outside the core.

The reinforcing ridges may form cavities with the rings, and the said cavities may be filled with liquid provided in the reflector, thus increasing the thermal insulation between the core and the reflector, ensured by the baffle.

It is possible to modify the profiles of the various elements placed next to each other according to their situation in such a manner that the rigidity of the baffle shall be practically uniform along its entire periphery. Moreover, it is also possible to reinforce certain elements by means of gussets arranged across the above mentioned ribs.

In order better to understand the technical characteristics and the advantages of the present invention, a description will be given hereinafter by way of example with reference to the drawings which show two forms of carrying a baffle for nuclear reactors into effect, it being understood that the description has no restrictive character as to the modes of carrying the invention into effect.

FIGURE 1 shows in cross-section of a reactor core.
FIGURE 2 shows the form and the arrangement of the various elements of the baffle.
FIGURE 3 shows the reinforcement of a ribbed element by means of a gusset.
FIGURES 4 and 5 show perspective views of the baffle, according to a second mode of construction.

FIGURE 1 shows a core of a known type: the fuel elements 1 are arranged in the form of a crown around moderating tubes 3 thus forming a core having a corrugated outer contour surrounded by a baffle 2. The cylinder is fixed at its upper part to the upper plate of support of the core and it is supported below by the lower plate of support of the core. The cylinder is reinforced in the direction of the height by one or several circular bands or cross rings (not illustrated).

FIGURE 1 shows that the baffle follows closely the outer contour of the core.

FIGURE 2 shows elements 5, 6, 7 of various contours and their arrangement around the core. On both sides of each element, ribs 8 are provided which are formed by turining over the edge of the element. The various elements are assembled to one another by bolting, riveting or welding of the ribs in such a manner as to form reinforcing ridges 9.

By placing the elements in the order shown at the figure, that is 5, 6, 7, 6, 5, 6, 7, 6, etc., a baffle is obtained of cylindrical shape with a corrugated surface which follows the outer contour of the core and which is formed of six profiled elements 5, twelve profiled elements 6 and six profiled elements 7. The width of the various elements may be calculated by taking into account the fact that the rigidity is reinforced by the bending of the element. In this way, the elements 6 and 7 may be wider than the elements 5 whilst maintaining the same thickness. In any way, it is laways possible to reinforce one or several elements by means of gussets.

The fuel rods are grouped in assemblies of hexagonal section, in such a manner as to form a core the outer contour of which has hexagonal shape. The contour is formed by the adjacent sides of the peripheral fuel assemblies forming angles of 120° between them. A suitable baffle for this core consists of the assembly of six prefabricated elements 11 which correspond to the six sides of the core.

Figure 5:
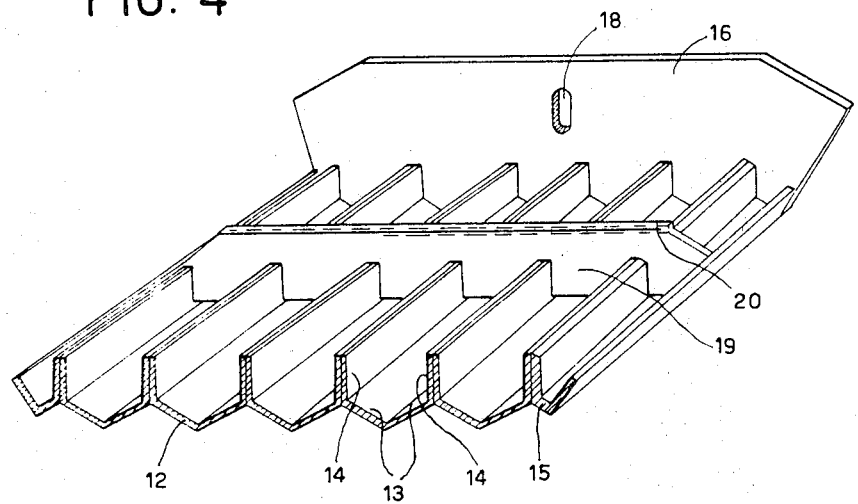

One of these elements is partly shown in FIGURE 5. Each element is formed of five profiles 12 of V shape, the faces 13 and 14 of which are turned over to form angles of 120° between themselves; these faces form four sides of an hexagon. The profiled elements 12 are assembled by welding of their faces 14 in such a manner as to form reinforcing ridges. The corners of the elements are formed by profiled elements 15, which may be thicker so as to reinforce the baffle. The elements 11 are fixed at the upper part and below to the segments 16 the association of which forms the flanges 17 of the baffle.

The segments 16 are provided with oval openings 18 serving to fix the baffle inside the reactor, whilst permiting the thermal expansion of the latter.

In order to increase the resistance of the baffle, the circular bands 19 are mounted around its periphery. The resistance of these bands 19 may be increased by bending over their edges to form beads 20.

Figure 1:
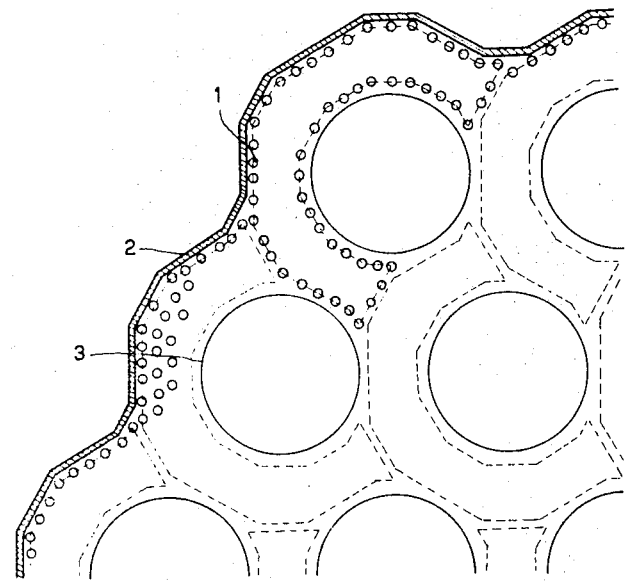
Figure 3:
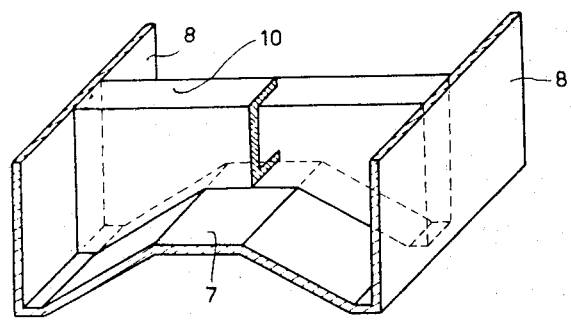
FIGURE 3 shows a gusset 10 reinforcing an element 7 of the baffle. The gussets are placed across between the ribs of the elements to be reinforced.
Figure 2:
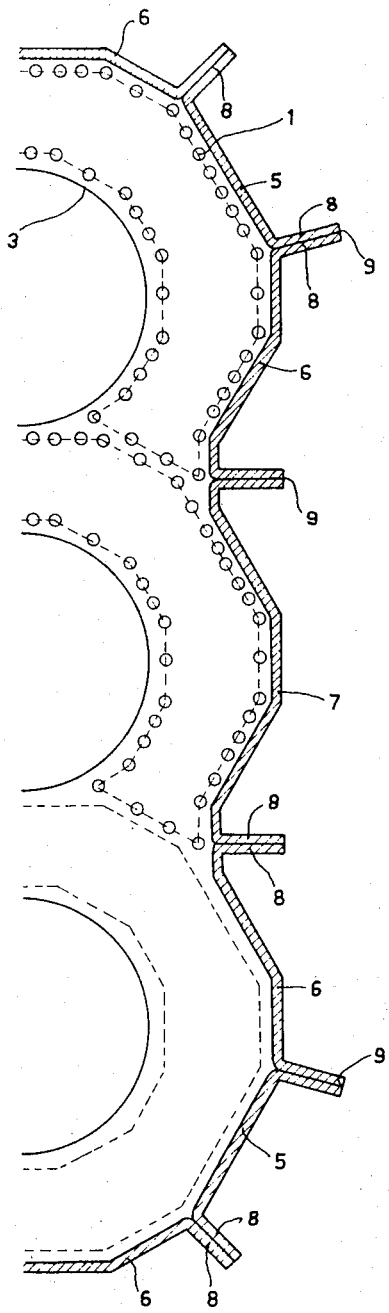
Figure 4:
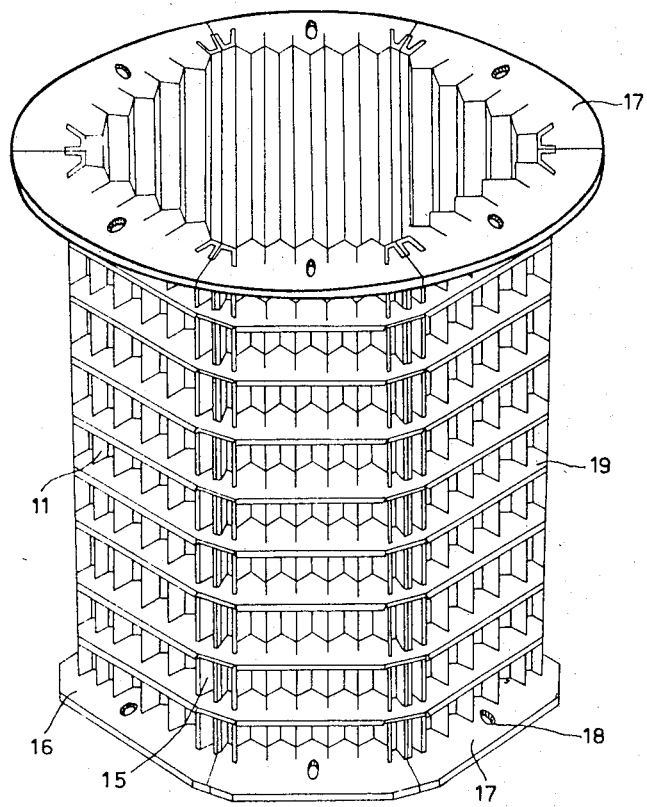
FIGURE 4 shows in perspective a baffle assembled according to another mode of carrying the present invention into effect.

A baffle constructed according to the present invention may have a highly reduced thickness in comparison with what it should be in the case illustrated in FIGURE 1. Calculations have shown that by means of the described elements, it was for instance possible to reduce the thickness of the baffle to about 2 mm., whilst the thickness of a casing of same rigidity but carried out as shown in FIGURE 1, would be of 6 mm. in the case considered.

It should be noted that thanks to the strong reduction of thickness made possible by the mode of construction according to the present invention, the absorption of neutrons in the baffle is considerably reduced. This is particularly important for cores of small size in which a considerable fraction of neutrons are sent back from the reflector to the core across the baffle.

What we claim is:

In a nuclear reactor in which a core is internally cooled by a fluid, an impervious baffle surrounds said core and said baffle is in turn surrounded by a reflector fluid, an improved baffle; comprising, a plurality of sections extending throughout the length of said core; said sections having their edges bent over to form flanges projecting outwardly away from the center of said core; said plurality of sections being joined at complementary abutting flanges to form outwardly projecting ribs; and annular bands reinforcing the outer surface of said baffle and forming cavities with said ribs adapted to receive a portion of said reflector fluid.

References Cited
UNITED STATES PATENTS

| | | | |
|---|---|---|---|
| 1,930,285 | 10/1933 | Robinson | 220—15 |
| 2,533,431 | 12/1950 | Chausson | 220—5 |
| 2,592,419 | 4/1952 | Harper et al. | 220—5 |
| 2,982,710 | 5/1961 | Leyse et al. | 176—18 X |
| 2,986,508 | 5/1961 | Vernon et al. | 176—51 X |
| 3,082,900 | 3/1963 | Goodman | 220—15 |
| 3,085,960 | 4/1963 | Correc | 176—85 |
| 3,149,044 | 9/1964 | DeBoisblanc et al. | 176—18 |

REUBEN EPSTEIN, *Primary Examiner.*